United States Patent [19]
Deviney et al.

[11] Patent Number: 5,403,655
[45] Date of Patent: Apr. 4, 1995

[54] TOUGHENED THERMOSETTING RESIN COMPOSITES AND PROCESS

[75] Inventors: Marvin L. Deviney; Joel J. Kampa, both of San Antonio, Tex.

[73] Assignee: Southwest Research Institute, San Antonio, Tex.

[21] Appl. No.: 317,692

[22] Filed: Oct. 5, 1994

Related U.S. Application Data

[62] Division of Ser. No. 94,258, Jul. 19, 1993.

[51] Int. Cl.$^6$ ................................. B32B 27/00
[52] U.S. Cl. ................... 428/319.7; 525/480; 525/486; 525/505; 525/534; 525/535; 525/540; 521/50.5; 521/110; 521/114; 521/117; 521/120; 521/134; 428/224; 428/311.1; 428/311.5; 428/317.1; 428/473.5
[58] Field of Search ............... 525/480, 486, 505, 534, 525/540; 521/50.5, 110, 114, 117, 120, 134; 428/224, 311.1, 311.5, 317.1, 319.7, 473.5

[56] References Cited

U.S. PATENT DOCUMENTS

| | | | |
|---|---|---|---|
| 4,640,971 | 2/1987 | Echigo et al. | 528/129 |
| 4,778,695 | 10/1988 | Echigo et al. | 427/213.34 |
| 5,098,781 | 3/1992 | Minnick et al. | 428/313.5 |
| 5,234,757 | 8/1993 | Wong | 428/311.1 |

*Primary Examiner*—Samuel A. Acquah
*Attorney, Agent, or Firm*—John L. Sigalos

[57] ABSTRACT

Toughened thermosetting resins are disclosed comprising a thermosetting resin having a Tg of at least 150° C., preferably 180° C., and having dispersed substantially uniformly therethrough microspheres of a thermoplastic resin having a Tg of at least 150° C., preferably 180° C. It is preferred to use thermoplastic resins with functional groups on the surface thereof capable of bonding to an available group on the thermosetting resin. High performance structural composites made from such toughened resins are disclosed as well as the process of making such composites.

12 Claims, No Drawings

5,403,655

TOUGHENED THERMOSETTING RESIN COMPOSITES AND PROCESS

This is a Division of U.S. application Ser. No. 08/094,258, filed Jul. 19, 1993.

BACKGROUND OF THE INVENTION

The present invention relates to novel thermosetting resin composites suitable for making high performance structures and processes related thereto.

There are a number of thermoset resins which are known to have what are called "high performance" properties; i.e. they have high heat resistance, high modulus, and high compression, tensile, and interlaminar shear strength, but relatively low resistance to impact. These thermosets are being used or considered for use in various aerospace, automotive and industrial products where high modulus, high strength and high heat resistance is necessary. These high performance thermoset resins include epoxy, bismaleimide, cyanate ester, and bisoxazoline-phenolic copolymer types.

There is particular need in the aircraft industry (aerospace, military, and commercial) for lightweight, high performance materials to be used for making structural elements. For proposed future aircraft, such as the advanced civil transport (subsonic) and the high speed civil transport which is proposed to fly at supersonic speeds, the structural elements thereof, such as the body and wing frame, ribs, spars, stringers, skins, and the like, must operate under such conditions that plastic composites used to make the same must withstand temperatures up 175° C. to to 200° C. while maintaining a high modulus (stiffness), high compressive and shear strengths, resistance to heat distortion, low coefficient of thermal expansion, and having excellent thermal shock resistance. In addition such plastics must have excellent adherence to reinforcing materials, whether they be carbon fibers or carbon woven fabrics, glass fibers or glass woven fibers, and, in some applications, adhere strongly to metals such as aluminum, iron, and copper. However, the above noted high performance thermoset resins are lacking in adequate toughness/resistance to impact and crack growth and require addition of "tougheners" for practical use in aircraft.

It has been known to "toughen" such resins in order to increase their resistance to impact damage and crack growth to which they are exposed in aerospace and other aircraft uses where structural elements made therefrom are exposed to high temperatures, impact, and/or high physical stress. However, materials such as acryonitrile-butadiene elastomers, and the like, which have been added to such high performance polymers to toughen the same have not been found to be suitable for thermosets intended for high temperature use. In such cases while toughening the resin they also act to lower the heat distortion temperature of the overall structures formed from such composite resin. The presence of reinforcing carbon and glass fibers still does not give the necessary toughness properties.

For high temperature structural uses it is necessary to achieve the toughening enhancement without substantially reducing the glass transition temperature or heat distortion temperature of the resultant toughened composite.

SUMMARY OF THE INVENTION

The present invention overcomes the problems of the prior art and provides thermosetting resin composites suitable for forming high performance structures, which composites actually have superior properties with respect to reduced impact damage and greater resistance to crack growth as opposed to the same resin which is not toughened in accordance with the instant invention.

Briefly stated, the present invention comprises a thermosetting resin suitable for forming high temperature structures comprising a thermosetting resin having a glass transition temperature (Tg) of at least 150° C. and having dispersed substantially uniformly therethrough microspheres of a thermoplastic resin having a Tg of at least 150° C., said microspheres being present in an amount sufficient to increase the resistance to impact and crack growth of said composite.

The present invention also comprises high performance structural composites utilizing said toughened thermosetting resin as hereinafter described as well as the process of making composites.

DETAILED DESCRIPTION

The essential components of the composites of the present invention are the thermosetting resin having a Tg of at least 150° C. and microspheres of a thermoplastic resin having a Tg of at least 150° C.

With respect to the thermosetting resin, those having a Tg of at least about 150° C. and, preferably, at least 180° C. can be used. Suitable examples are epoxy resins, bismaleimides, cyanates (triazine resins) and the ring-opening reaction products of bisoxazolines with phenolic resins. Of these, the bisoxazolinesphenolic resins are preferred since they have very high modulus and strengths, very low cure shrinkage, low coefficient of thermal expansion, high heat distortion temperature, zero release of curing volatiles, and also have low smoke and heat release properties, and the instant invention will be described in connection therewith.

The bisoxazolines-phenolic resins and their method of manufacture are those described in U.S. Pat. No. 4,430,491 which is incorporated herein by reference. Generally, these resins are prepared by reacting a first reactant consisting of an oligomer containing a plurality of aromatic hydroxyl groups and a second reactant consisting of a compound have at least two 2-oxazoline groups. Slow thermal cures can be employed, but catalysts can be used to accelerate the cure of these polycondensation reaction products.

It has been found that in order to have bisoxazoline-phenolic copolymer resins having a glass transition temperature (Tg) of about 200° C., such Tg values are obtained with copolymers containing weight ratios of bisoxazolines to phenolic resin of 45/55 to 70/30, and above. As to the bisoxazoline it is preferred to use 2,2'-(1,3-phenylene) bisoxazoline. With respect to the phenolic resin it is preferred to use a phenolic novolak resin as set forth in U.S. Pat. No. 4,430,491.

With respect to the microspheres it is required that the one utilized have a Tg of at least about 150° C. and that it be compatible with the thermosetting resin to which it is added. Moreover, it must be capable of being admixed with the thermosetting resin to be used at temperatures at which the thermosetting resin precursor reactants are molten, without the microspheres themselves becoming solubilized or melted. The particular thermosetting resin-thermoplastic resin microsphere combinations that are optimum can be readily determined by experimentation following the teachings of the instant invention. Examples of suitable thermoplastic resins having a glass transition temperature of at least 150° C. are the polyether-imides, polysulfones, polyether sulfones, aromatic polyesters (polyarylates), polyphenylene ether blends, polyarylsulfones, or polycarbonate-polyphthalate copolymers. With respect to the use of a thermosetting bisoxazoline-phenolic resin, it is preferred to use polyether sulfone types.

A further reason for the use of the preferred polyether sulfones with the bisoxazoline-phenolic resin is that certain polyether sulfones contain phenolic hydroxyl groups in their molecular structure, particularly at the ends of the polymer chains. As a consequence there is a reaction between the oxazoline ring-opening groups on the bisoxazoline molecule with the phenolic-OH groups on the surface of the polyether sulfone microspheres. In short, the thermosetting resin has functional groups which can react with groups on the thermosetting resin. Such a bonding reaction between the hydroxyl groups on the surface of the polyether sulfone microspheres and the bisoxazolinephenolic continuous matrix acts, it is believed, to absorb crack propagation energy and prevent pullout of the toughener microspheres from the thermoset matrix in which they are embedded.

As is within the skill of those in the chemical arts, all the thermoplastic resins can be functionalized with functional groups, in addition to the phenolic hydroxy groups noted, such that a cross-linking or curing reaction results in chemical bond formation between the bisoxazoline-phenolic matrix theromoset and the functional groups on the surface of the embedded thermoplastic microspheres.

If any particular thermoplastic resin does not contain any available functional groups capable of reacting with groups on the thermosetting resin to bond therewith, the thermoplastic resin can be functionalized using any of the known and conventional methods to include functional groups thereon. While preferred it is not necessary, however, that there be any functional groups on the microspheres.

As to proportions, the desired degree of toughening can be effected by adding about 0.5 to 35 wt. % of the microspheres, the optimum amounts for any given combination of the thermosetting resin-thermoplastic resin being readily determined by experimentation. Thus, for a bisoxazoline-phenolic resin about 3.5 to 25 wt. % polyether sulfone is suitable.

As noted, it is also important to utilize the thermoplastic resin in the form of microspheres, preferably microspheres having a diameter from 0.1 to 50 microns, preferably from 0.5 to 20 microns. It is desired also to have them in the form of microspheres rather than as jagged particles in order to enable the surface reaction noted above and also because the circular shape gives greater strength and does not provide sharp interfaces with the matrix resin where crack growth could begin. It will be understood that the microspheres need only be generally spherical.

The methods of making the microspheres are most suitably techniques used in forming microcapsules, particularly solvent evaporation and rotating disk methods. In the rotating disk method the thermoplastic resin in flowable form is fed onto a rotating disk which, as it spins, will form droplets of the thermoplastic. The feed rate, viscosity of thermoplastic resin, and speed of rotation of the disk can be varied to give the microcapsules the desired particle size dimensions. In solvent evaporation the thermoplastic resin is admixed with a solvent therefor and the solvent mixture added to water with stirring to form an emulsion of the droplets of the thermoplastic resin. The solvent is evaporated and the droplets that are formed will solidify and are then simply separated and dried for use. Again, the size desired can be controlled by varying the degree of agitation and the other processing parameters as well known to those skilled in the microencapsulating art.

In forming the composite it is only necessary to heat the bisoxazoline and phenolic resin reactants used to form the thermosetting resin into molten form and to add thereto the thermoplastic microspheres. The microspheres are mixed and well dispersed in the molten thermosetting resin reactants while they are being reacted to form the thermosetting resin. Such addition should be carried out with thorough mixing in order to ensure that there is essentially uniform distribution of the microspheres throughout the thermosetting resin matrix. This can be accomplished by a variety of mixing techniques that are conventional, such as the use of vacuum mixing techniques, ultrasonic mixing, and the like. In this regard, in order to assist in the uniform distribution of the microspheres in the thermosetting resin, a conventional dispersing agent, such as fumed silica can be added to the resin mixture. These agents act to prevent the microspheres from settling out or floating to the top of the molten mixture before the mixture gels to form the composite having the microspheres distributed substantially uniformly therethrough. The amount of dispersing agent added can vary widely, but ordinarily about 0.1 to 1.5 wt. % is used.

The molten composite of the thermosetting resin and thermoplastic microspheres can be formed into any shape desired by being poured into a suitably shaped mold and cured. Suitable catalysts can be added to effect or expedite curing.

In addition, structural composites can be made by impregnating unidirectional carbon or glass fiber tow, woven or nonwoven mats, or three dimensional stitching preforms or the like with the molten thermosetting resin having the microspheres dispersed therein and then molding and curing the prepreg. In addition to the prepregging operation, these same principles and techniques can be applied in other composite fabrication operations such as pultrusion, resin transfer molding (RTM), and injection molding.

It will be largely evident from the foregoing that the aerospace, aircraft, or other high performance engineering structures desired such as a structural member wing struts, body ribs, and the like, of a supersonic aircraft or other high performance aircraft, for example, can also be made by molding the thermosetting resin-microsphere mixture and reinforcing fiber into a block which can then be cut or machine-trimmed into the desired structural shape required.

The invention will be further described in connection with the following examples which are set forth for purposes of illustration only.

EXAMPLE 1

2,2'-(1,3-phenylene)bisoxazoline (7.2 parts by weight) was mixed with 4.8 parts by weight phenolic novolak (ALNOVOL PN-320), then heated to 160° C. with stirring in order to achieve a homogeneous precursor mixture. The molten mixture was then immediately poured out on a sheet of aluminum foil and allowed to cool. The hardened, brittle unreacted mixture was then broken into smaller pieces, ground to a coarse powder, and placed into the bottom of a vacuum chamber containing an agitator. 0.63 parts by weight of a polyether sulfone (VICTREX 5003P) which had been processed into microspheres with particle sizes between 2 and 15 microns was mixed with 0.06 parts by weight of fumed silica (CAB-O-SIL PTG grade) and loaded into a powder addition tube attached to the vacuum chamber. The entire apparatus was evacuated and the powdered reagents vacuum dried by opening a valve connected to a vacuum pump. The valve was then closed and the lower half of the apparatus heated to 160° C. Once the precursor mixture was molten, stirring was initiated and the powder addition tube opened to add the thermoplastic microspheres and fumed silica into the molten mixture with vigorous stirring. After the addition was complete, the valve to the vacuum pump was again opened in order to de-gas the molten mixture while stirring until the mixture appears homogeneous. The mixture was then transferred to a suitably prepared mold and then cured without catalyst at 200° C. for 18 hours, followed by a post-cure at 220° C. for 2 hours. The result was a molded composite containing the microspheres distributed substantially uniformly therethrough.

EXAMPLE 2

The process of Example 1 was repeated to prepare the coarse reaction mixture powder which was then placed into a vessel equipped with an ultrasonic mixer and a mechanical stirrer.

The vessel then heated to 160° C. in order to melt the resin and as in Example 1, VICTREX, which had been processed into microspheres with particle sizes between 2 and 15 microns, was mixed with the fumed silica CAB-O-SIL PTG grade) and added to the molten resin precursor mixture with vigorous mechanical stirring. After the thermoplastic microspheres were added, the mechanical stirrer was replaced with the ultrasonic microprobe.

The resultant mixture was then sonicated until the mixture appeared homogeneous. The ultrasonic probe was then removed and the vessel sealed and evacuated. After the resin was de-gassed, it is quickly poured into a suitably prepared mold. The resin was then cured without catalyst at 200° C. for 18 hours, followed by a post-cure at 225° C. for 2 hours.

The substantially uniform dispersion of the microspheres was observed in the cured resin using optical microscopy.

EXAMPLE 3

To a molten mixture of 60/40 weight percent ratio of 2,2'-(1,3-phenylene) bisoxazoline to ALNOVOL PN-320 phenolic novolak was added 5% weight of VICTREX 5003P in the form of microspheres of diameter range 1 to 20 micrometers. Thorough mixing under 29 in. Hg vacuum was accomplished using a small tipped ultrasonic probe. 0.8% CAB-0-SIL was also added as a facilitator or dispersing agent to keep the VICTREX microspheres highly dispersed and to prevent them from either floating on the surface or settling out of the molten resin mixture. Curing of the resin was carried out without catalyst at 200° C. for 18 hours, followed by a 2-hour post cure at 225° C. The small, thoroughly dispersed microspheres were easily visible in the cured resin after curing, using an optical microscope.

The curing mold consisted of two heavy duty glass plates separated by a ⅛" thick silicone rubber gasket-spacer. Test bars measuring 3" long, 2" wide and ⅛" thick were cut from the cured composite plaques for flex testing (ASTMD 790).

Flexure (three point bending) tests to failure were carried out using a SINTECH Model 20/G stress-strain type instrument, with computerized data reduction. The above described toughened resin test specimen, containing 5% wt. VICTREX microspheres and 0.8% CAB-O-SIL, exhibited a 24.70 inch-pound "energy to break" (i.e., area under the stress strain curve), an elastic modulus of 736,760 psi and a total elongation (i.e., "depth of bend" at break due to flex) of 0.27 inches.

In comparison, the corresponding values (average) of two 60/40 bisoxazoline-phenolic control specimens cured identically (but containing no VICTREX nor CAB-O-SIL) were 21.13 inch-lb. energy to break, 778,000 psi elastic modulus and 0.225 in elongation (i.e., bend depth) at break.

EXAMPLE 4

The procedure of Example 3 is followed except that the molten thermosetting resin with the microspheres distributed therethrough is poured into the mold in which has previously been placed a stack of unidirectional carbon fiber plies (stacked symmetrically at several different angles) or a stack of woven carbon fiber plies, or a stitched 3-dimensional carbon fiber preform. The resulting composites have properties superior to composites prepared from identical components, but without the use of thermoplastic microspheres.

In similar experiments, the molten thermoset resin precursors-microspheres mixture is pumped (using a resin transfer molding machine) into a cavity mold containing undirectional, woven, or 3-dimensional stitched carbon fiber reinforcements. Again, superior properties are obtained.

EXAMPLES 5 to 9

The procedures of Example 3 and 4 are followed except that the polyether sulfone used (VICTREX 5003P) is replaced separately, and in turn, with an equivalent amount of each of the following: two polyetherimides, (ULTEM-100 grade and -600 grade), a polysulfone (UDEL P-1700), and two polyether sulfones (VICTREX PES 3600 and 4800).

Equally improved results are obtained in comparison to the untoughened thermosetting resin.

EXAMPLES 10 to 16

The procedures of Example 3 and 4 are followed except that the thermosetting bisoxazoline-phenolic novolak is replaced separately and in turn, with an equivalent amount of each of the following: three epoxy resins (TACTIX 742; ARALDITE 720; and EPON HPT 1071; two bismaleimides (Amer. Cyanamide 3135 and NARMCO 5250-4); and two cyanate ester (DOW XU 71787 and AROCY L-10 by Rhone-Poulenc).

The addition of the microspheres results in tougher composites.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. A toughened thermosetting resin for forming high performance structural composites comprising a thermosetting resin having a Tg of at least 150° C. and having dispersed substantially uniformly therethrough microspheres of a thermoplastic resin having a Tg of at least 150° C.

2. The resin of claim 1, wherein said thermosetting resin is the polymerization reaction product of a first reactant consisting of an oligomer containing a plurality of aromatic hydroxyl groups and a second reactant consisting of a compound having at least two 2-oxazoline groups.

3. The resin of claim 2, wherein the thermoplastic resin is a functionalized or non-functionalized polyether sulfone, polyetherimide, polysulfone, polyarylate, polyphenylene ether blend, polyarylsulfone, or polycarbonate-polyphthalate copolymer.

4. The resin of claim 3, wherein the thermoplastic resin is a functionalized polyether sulfone and the microspheres range in diameter from about 0.1 to 50 microns.

5. The resin of claim 4, wherein the thermosetting resin is the polycondensation product of 2,2'-(1,3-phenylene) bisoxazoline and a phenolic novolak and the microspheres are present in an amount of about 0.5 to 35 wt. %.

6. A process of making a toughened thermosetting resin composite comprising admixing microspheres of a thermoplastic resin having a Tg of at least 150° C. with molten precursors for forming a thermosetting resin having a Tg of at least 150° C. to distribute said microspheres substantially uniformly through said thermosetting resin and then curing said thermosetting resin.

7. The process of claim 6, wherein said thermosetting resin is the polymerization reaction product of a first reactant consisting of an oligomer containing a plurality of aromatic hydroxyl groups and a second reactant consisting of a compound having at least two 2-oxazoline groups.

8. The process of claim 7, wherein the thermoplastic resin is a functionalized or non-functionalized polyether sulfone, polyetherimide, polysulfone, polyarylate, polyphenylene ether blend, polyarylsulfone, or polycarbonate-polyphthalate copolymer.

9. The process of claim 8, wherein the thermoplastic resin is a functionalized polyether sulfone and the microspheres range in diameter from about 0.1 to 50 microns.

10. The process of claim 9, wherein the thermosetting resin is the polycondensation product of 2,2'-(1,3-phenylene) bisoxazoline and a phenolic novolak and the microcapsules are present in an amount of about 0.5 to 35 wt. %.

11. The process of claim 10 wherein a dispersing agent is also admixed with said molten thermosetting resins.

12. The process of any one of claims 7 to 11 wherein a unidirectional carbon or glass fiber tow, a woven or nonwoven mat, or three dimensional stitching is embedded in said thermosetting resin and the entire combination placed in a mold prior to cure.

* * * * *